United States Patent
Guth et al.

(10) Patent No.: US 7,500,693 B2
(45) Date of Patent: Mar. 10, 2009

(54) AIRBAG ARRANGEMENT AND CONTROL DEVICE

(75) Inventors: Oliver Guth, Dudenhofen (DE); Jurgen Zimmerle, Maximiliansau (DE); Michael Gerstenberger, Brotterode (DE); Stefan Steinke, Iserlohn (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 462 days.

(21) Appl. No.: 11/272,245

(22) Filed: Nov. 10, 2005

(65) Prior Publication Data

US 2006/0125218 A1 Jun. 15, 2006

(30) Foreign Application Priority Data

Nov. 17, 2004 (DE) .................. 10 2004 055 418

(51) Int. Cl.
*B60R 21/215* (2006.01)
*B60R 21/26* (2006.01)

(52) U.S. Cl. ............... 280/728.3; 280/735; 280/742

(58) Field of Classification Search ........... 280/728.3, 280/732, 735, 736, 742, 728.2
See application file for complete search history.

(56) References Cited

U.S. PATENT DOCUMENTS

| | | | | |
|---|---|---|---|---|
| 5,135,253 A | | 8/1992 | Hirashima et al. | |
| 5,496,059 A | * | 3/1996 | Bauer | 280/728.3 |
| 6,126,195 A | * | 10/2000 | Lutz | 280/737 |
| 6,315,321 B1 | * | 11/2001 | Lutz | 280/728.3 |
| 7,036,843 B2 | * | 5/2006 | Okamoto et al. | 280/728.3 |
| 2003/0209892 A1 | | 11/2003 | Hier et al. | |
| 2004/0232662 A1 | * | 11/2004 | Loeper et al. | 280/728.3 |

FOREIGN PATENT DOCUMENTS

| | | |
|---|---|---|
| DE | 04217177 | 11/1993 |
| DE | 29721643 U | 4/1998 |
| DE | 19960251 | 6/2001 |
| DE | 10106661 | 9/2002 |
| DE | 10111597 | 1/2003 |
| DE | 10311854 | 11/2003 |
| DE | 10316226 | 12/2003 |
| EP | 0711627 A2 | 5/1996 |
| EP | 0711627 B1 | 7/2000 |
| GB | 2387580 | 10/2003 |

* cited by examiner

*Primary Examiner*—Eric Culbreth
*Assistant Examiner*—Joseph Rocca
(74) *Attorney, Agent, or Firm*—Matthew B. Dernier, Esq.; Gibson & Dernier LLP

(57) ABSTRACT

An airbag arrangement includes: means for inflating an airbag; an airbag cover, which covers a firing channel and is connected to interior paneling; and means for pressurizing the firing channel with gas pressure.

21 Claims, 5 Drawing Sheets

AIRBAG ARRANGEMENT AND CONTROL DEVICE

BACKGROUND OF THE INVENTION

The invention relates to an airbag arrangement, in particular for a passenger seat airbag, as well as a control device for the airbag arrangement.

From the state of art it is well known to attach an airbag cover having a predetermined breaking point to an interior paneling such as a dashboard. The predetermined breaking point may be designed for example in the form of grooves. Following activation, the airbag is inflated, causing the deploying airbag to impinge upon the rear of the airbag cover. Due to the resulting forces, the predetermined breaking point breaks open. allowing the airbag cover to open up so as to expose an outlet opening for the airbag.

Such airbag arrangements are known for example from DE 101 06 661 A1, DE 103 11 854 A1, DE 101 11 597 A1, DE 103 16 226 A1 and EP 0 711 627.

SUMMARY OF THE INVENTION

In contrast, it is the object of the invention to create an improved airbag arrangement and an improved control device for an airbag arrangement.

The objectives of the invention are achieved by the characteristics recited in the independent patent claims. Preferred embodiments of the invention are disclosed in the dependent patent claims.

The invention creates an airbag arrangement, comprising means for inflating an airbag, an airbag cover covering the airbag firing channel and connected to an interior paneling as well as means for pressurizing the firing channel with gas pressure.

Pressurizing the firing channel with gas pressure has the advantage that as a result the airbag cover may be removed, at least partially, from the interior paneling, in particular preferably before the deploying airbag impinges upon the airbag cover. By pressurizing the firing channel with the gas pressure for example, the predetermined breaking point or predetermined breaking line connecting the airbag cover with the interior paneling is forced open. Alternatively or in addition, the airbag arrangement may be designed such that due to the gas pressure inside the firing channel the airbag cover is at least opened partially.

This has the advantage that the gas pressure inside the airbag can be reduced since the airbag, while being deployed, will impinge upon the airbag cover, which has already been partially separated from the interior paneling and/or opened. The decrease in the gas pressure during deployment of the airbag is of advantage for the safety of the vehicle driver and passengers during impact. Another advantage is that the risk of particles separating from the airbag cover due to the impact of the deploying airbag can be reduced.

According to one embodiment of the invention, control devices are provided, which are designed for controlling the inflating means and the means for pressurization the firing channel with gas pressure. For example, the control devices will send a first control signal to the pressurizing means, followed by a second control signal to the inflating means, the first and second control signals being transmitted in staggered intervals. During deployment of the airbag, this way initially gas pressure is built inside the firing channel in order to separate the airbag cover at least partially from the interior paneling before the deploying airbag will impinge upon the airbag cover. In at least another example, the control devices will send a first control signal to the inflating means, followed by a second control signal to the pressurizing means, the first and second control signals being transmitted in staggered intervals.

According to one embodiment of the invention, the time interval between the pressurization of the firing channel with gas pressure to achieve at least a partial separation of the airbag cover from the interior paneling and the inflation of the airbag is no more than 20 ms.

According to one embodiment of the invention, the means for inflating the airbag and the means for pressurizing the firing channel with gas pressure are implemented as a gas generator, which is connected to the firing channel as well as to the airbag. Preferably a valve device is arranged between the gas generator and the firing channel and/or the airbag. After activation of the gas generator, in a first valve setting initially the firing channel is pressurized with the gas effusing from the gas generator; thereafter the valve is moved to a second valve setting, allowing the gas to flow into the airbag.

According to one embodiment of the invention, the airbag cover has a grid structure or a segment structure. Due to the gas pressure built up inside the firing channel before the airbag impinges upon the airbag cover, the airbag cover is pulled partially beneath the dashboard. The part of the cover extending inside the firing channel is then folded along a grid or segment line by the impinging airbag, exposing the outlet opening.

According to one embodiment of the invention, the firing channel is configured weaker in one area, causing the firing channel to deform in this area during pressurization with the gas pressure, wherein this area is mechanically linked to the airbag cover.

The firing channel, for example, is made of sheet metal having a certain wall thickness. The wall thickness is reduced in the weaker area. As an example, the wall thickness of the sheet metal is 1.5 mm, while in the weaker area it is only 0.4 mm.

During pressurization of the firing channels with the gas pressure, the weaker area is deformed since it does not withstand the gas pressure. Due to the mechanical connection of the area to the airbag cover, the airbag cover is pressurized with a force, resulting in the at least partial separation of the airbag cover from the interior paneling and/or the at least partial opening of the airbag cover. For example a tension element, in particular a strap fastened between the weaker area and the airbag cover, serves to mechanically connect the weaker area and the airbag cover.

According to one embodiment of the invention, the weaker area is arranged at a side of the firing channel facing the windshield base. Due to the deformation of the weaker area of the firing channel in the direction towards the windshield base, the airbag cover can be pulled at least partially under the dashboard. The retraction of the airbag cover to the inside, i.e. below the dashboard, reduces the risk for injuries further.

According to another embodiment a drive element is arranged on or in the firing channel, the element being mechanically connected to the airbag cover. The drive element has a temperature-inducible deformation effect.

The gas supplied by the gas generator has a temperature of, for example, approximately 1000 to 1800 Kelvin. During pressurization of the firing channel with gas pressure, the hot gas flows from the gas generator into the firing channel, thus triggering the deformation effect, as a result of which the airbag flap is pressurized with a driving force, which serves the at least partial separation of the airbag flap from the interior paneling and/or the at least partial opening of the airbag cover.

So as to implement the temperature-inducible deformation effect of the drive element, several suitable technologies may be employed. For example a drive element may be implemented by layering materials having varying thermal expansion coefficients; when different metallic materials are used, such an arrangement is referred to as a bimetallic strip.

According to one embodiment of the invention, a temperature-inducible deformation effect is achieved by using materials having a shape memory effect. Corresponding alloys are also referred to as shape-memory alloys (SMA). Examples include the NiPi- and NiTiPb alloys. Other shape memory alloys are known from "Legierungen mit Formgedächtnis (Alloys with shape memory)", Dieter Stöckel, Erhard Hornbogen, Expert Publishing House, 1988, ISBN 3-8169-0323-1. Alternatively or in addition, also conductive plastics, as they are known from the poly-electronics field, may be employed.

The shape memory effect is a reversible effect, which may be a one-way or two-way effect. This reversible effect is based on the fact that so-called memory alloys have a considerably lower stability in the martensitic state than in the high-temperature phase. Therefore warming causes the actuator to change its shape into the high-temperature shape. In the case of the two-way effect, the material "remembers" both the low-temperature and the high-temperature shapes. In a special case of the two-way effect, materials exhibiting an all-round effect may be used.

In another aspect, the invention relates to a control device for an airbag arrangement. The control device receives a sensor signal from, for example, an acceleration sensor. The control device analyzes the sensor signal as to whether a condition for activation of the airbag is given.

If, for example, the sensor signal indicates a value above a threshold value, the activation condition is fulfilled and the control device sends a control signal for the pressurization with gas pressure and the inflation of the airbag. The gas generator is activated for example by a control signal. Thereafter, gas flows from the gas generator into the firing channel in order to build pressure inside the firing channel, which will lead to the at least partial separation of the airbag cover from the interior paneling. After a short time interval, which for example is shorter than 20 ms, the control device sends another control signal in order to change the valve setting, as a result of which the gas from the gas generator flows no longer into the firing channel but into the airbag.

BRIEF DESCRIPTION OF THE DRAWINGS

Preferred embodiments of the invention are explained more closely with reference to the drawings hereinafter, wherein.

DETAILED DESCRIPTION OF THE PREFERRED EMBODIMENTS

Figure 1:
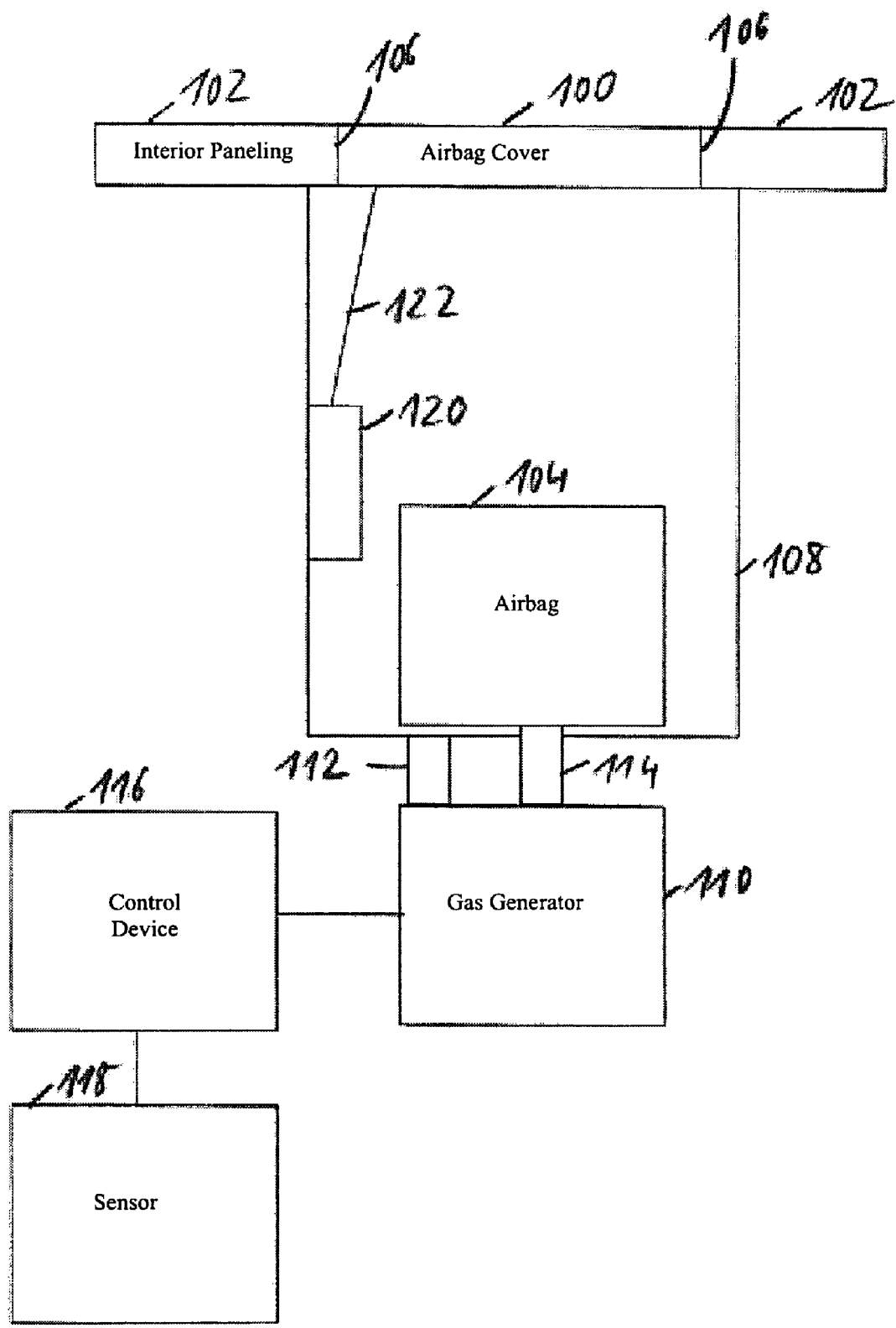
FIG. 1 is a schematic illustration of an embodiment with an airbag arrangement according to the invention.

FIG. 1 shows an embodiment of an airbag arrangement according to the invention. The airbag arrangement comprises an airbag cover 100, which is connected to an interior paneling 102. The interior paneling 120 is, for example, a dashboard.

The airbag cover 100 closes the outlet opening of a firing channel for an airbag 104 of the airbag arrangement. The airbag arrangement 100 is connected to the interior paneling 102, for example, by one or more predetermined breaking points 106. The predetermined breaking points 106 may be configured, for example, as predetermined breaking lines. For the implementation of the predetermined breaking lines, for example a groove is cut into the base material of the interior paneling 102 and/or airbag cover 100 from beneath along the edges of the airbag cover 100. This may be performed for example mechanically, with the use of an ultrasonic knife or a laser beam.

Furthermore the airbag arrangement comprises an airbag module 108 for the purpose of incorporating the firing channel for the deployment and exiting of airbag 104 from the outlet opening, which during regular operation is covered by the airbag cover 100. During regular operation the airbag 104 is folded inside the airbag module 108.

A gas generator 110 is arranged on the airbag module 108. The gas generator 110 is connected to the airbag module 108 by means of a gas pipe 112, allowing the gas produced by the gas generator 110 to flow into the firing channel. Furthermore, the gas generator 110 is connected to the airbag 104 by means of a gas pipe 114, allowing the gas generator 110 to inflate the airbag 104. Alternatively also two gas generators may be provided, one of the gas generators being connected to the firing channel and the other gas generator being connected to the airbag.

A control device 116 of the airbag arrangement is connected to a sensor 118. The sensor 118 is an acceleration sensor, for example. The sensor continuously supplies acceleration signals to the control device 116. When the acceleration signal exceeds a predefined limit, the control device 116 sends an activation pulse to the gas generator 110 in order to activate the airbag 104.

After receiving the activation signal, a pyrotechnic charge of the gas generator 110 is ignited, causing the gas created by gas generator 110 to flow through the gas pipe 112 into the firing channel and through the gas pipe 114 into the airbag 104. By pressurizing the firing channel with gas pressure, at least some of the predetermined breaking points 106 are separated and/or the airbag cover 100 is opened at least partially. This has the advantage that the separation of the airbag cover 100 from the interior paneling 102 and/or the opening of the airbag cover 100 are not, or not solely, caused by the impact of the deploying airbag 104 on the airbag cover 100.

Accordingly a low gas pressure may be chosen for the deployment of the airbag 104. This reduces the requirements that are placed on the mechanical design of the airbag module 108 and the airbag cover 100, in particular as far as the risk of particles separating during the impact of the deploying airbag 104 on the rear of the airbag cover 100 is concerned. Furthermore, less pressure during the deployment of the airbag 104 into the passenger compartment also leads to a lower risk of injuries for the vehicle driver and passengers. Finally, due to the lower gas pressure that is required inside the airbag 104 for deployment, a smaller gas generator 110 may be selected.

The gas generator 110 may be configured such that the gas it produces can flow, at least initially, through both gas pipes 112 and 114. Furthermore a valve device (not shown in the figure) may be provided, which can be regulated by the control device 116. During activation of the gas generator 110, the valve device is set such that the produced gas initially flows only through the gas pipe 112 into the firing channel, but not into the airbag.

Following a short time interval of for example no more than 20 ms, the control device 116 sends another control signal to the valve device so as to set it such that the produced gas no longer flows through the gas pipe 112 into the firing channel, but flows through the gas pipe 114 into the airbag 104. This has the advantage that initially gas pressure is built up briefly in the firing channel, allowing the airbag cover 100 to be at least partially separated from the interior paneling 102. Only after the firing channel has been pressurized with the gas pressure and/or after the airbag cover 100 has been separated at least partially from the interior paneling 102 and/or has been opened at least partially will gas from the gas generator 110 flow through the gas pipe 114 into the airbag 104 in order to deploy it.

According to another embodiment, a drive element 120 is disposed in the firing channel, i.e. on or inside a wall of the airbag module 108. The drive element 120 may be, for example, a bimetallic strip or a shape memory element. The drive element 120 is connected mechanically to the airbag cover 100 by means of a strap 122.

After activation of the gas generator 110, hot gas flows through the gas pipe 112 into the firing channel. Typically the gas has a temperature of approx. 1000 to 1800 Kelvin. Since the drive element 120 heats up due to the gas, its deformation effect is activated, causing the drive element 120 to apply a tensile force on the airbag cover 120 by means of the strap 122, which breaks open at least some of the predetermined breaking points 106 and/or opens the airbag cover 100 at least partially.

Figure 2:
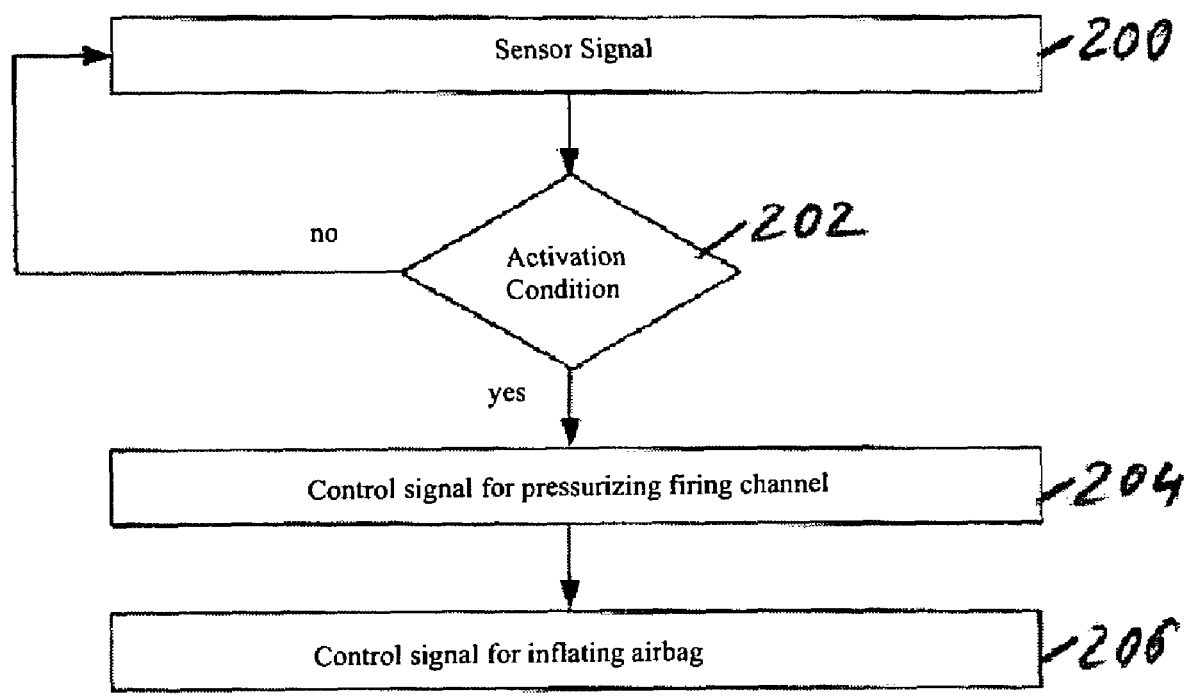
FIG. 2 is a flow chart of a principle of operation of the control device.

FIG. 2 shows a corresponding flow chart. In step 200 the control device of the airbag arrangement receives a sensor signal, for example from an acceleration sensor, which measures the current acceleration data of the vehicle. In step 202 the control device verifies whether an activation condition for the airbag has been met by the current driving parameters of the vehicle.

If this is the case, the control device emits a control signal in step 204 in order to pressurize the firing channel with gas pressure, causing the airbag cover to separate at least partially from the interior paneling and/or to open the airbag cover at least partially. In addition, a control signal is emitted in step 206 in order to inflate the airbag. Steps 204 and 206 can basically be applied simultaneously, with time overlaps or successively.

Figure 3:
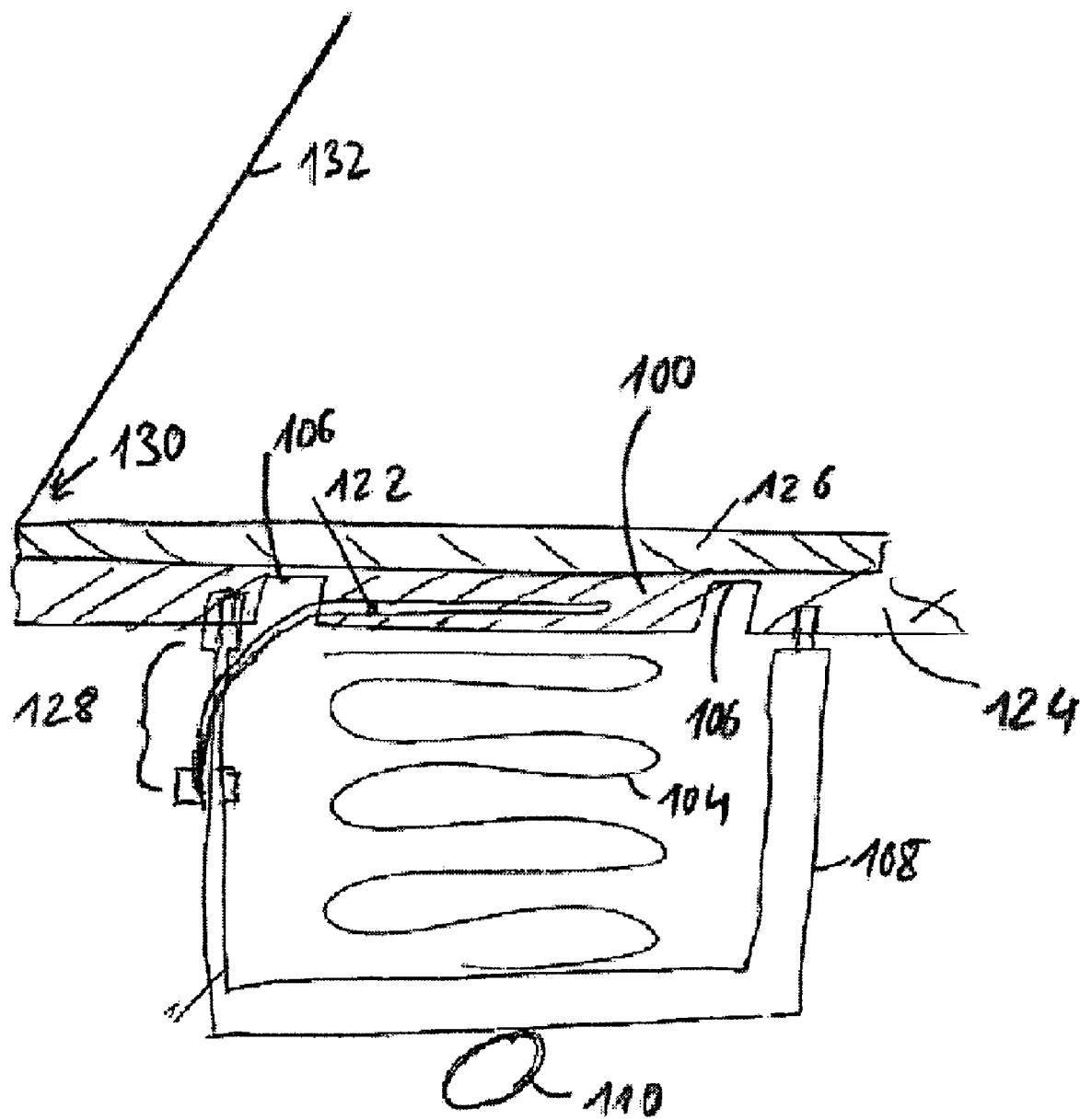
FIG. 3 is another embodiment of the airbag arrangement according to the invention.

FIG. 3 illustrates another embodiment of the airbag arrangement. Elements in FIG. 3 that correspond to elements from FIG. 1 have been marked with the same reference numeral. The airbag cover 100 is incorporated inside a carrier material 124 of the interior paneling. For this purpose, weakening grooves 106 are cut into the carrier 124. A decorative film 126 is arranged on the carrier 124.

The strap 122 is designed on one end as a fabric insert of the airbag cover 100. On the other end, the strap 122 is connected to a weaker area 128 of the airbag module 108. The walls of the airbag module 108 are made, for example, of drawn sheet metal having a wall thickness of for example approx. 1.5 mm. The wall thickness in the weaker area 128 has been reduced. For instance, the wall thickness in the weaker area 128 is approx. 0.4 mm. The weaker area 128 is preferably arranged on a side of the airbag module 108 that is disposed on the windshield base 130 of a windshield 132 of the vehicle.

After the airbag arrangement control releases the activation signal, gas pressure is initially built inside the firing channel formed by the airbag module 108 so that the weaker area 128 deforms. Due to the deformation of the weaker area 128, a force is applied on the airbag cover 100 by means of the strap 122, the force leading to the tearing of the weakening grooves 106. Furthermore, due to the tensile force, the airbag cover 100 can be pulled at least partially beneath the carrier 124 so that the outlet opening is already exposed at least partially when the airbag 104 deploys.

In another embodiment a rebound strap is attached on the bottom of the dashboard to the airbag cover. The rebound strap is guided inside the airbag module e.g. by means of a milled slot and is sewn to the airbag after it was guided across a deflection pulley.

The airbag cover is opened by the pulse during ignition of the airbag. However, the airbag cover retracts into the inside of the dashboard, controlled by the deflection and the deploying airbag; the farther the airbag protrudes from the dashboard, the more the airbag cover is pulled inside the dashboard across the deflection pulley.

Therefore, in this embodiment, the airbag cover is at least partially detached and/or opened as a result of the gas pressure built inside the firing channel. Further opening of the airbag cover then occurs by means of the deploying airbag in that the rebound strap pulls the airbag cover across the deflection pulley beneath the dashboard.

Figure 4:
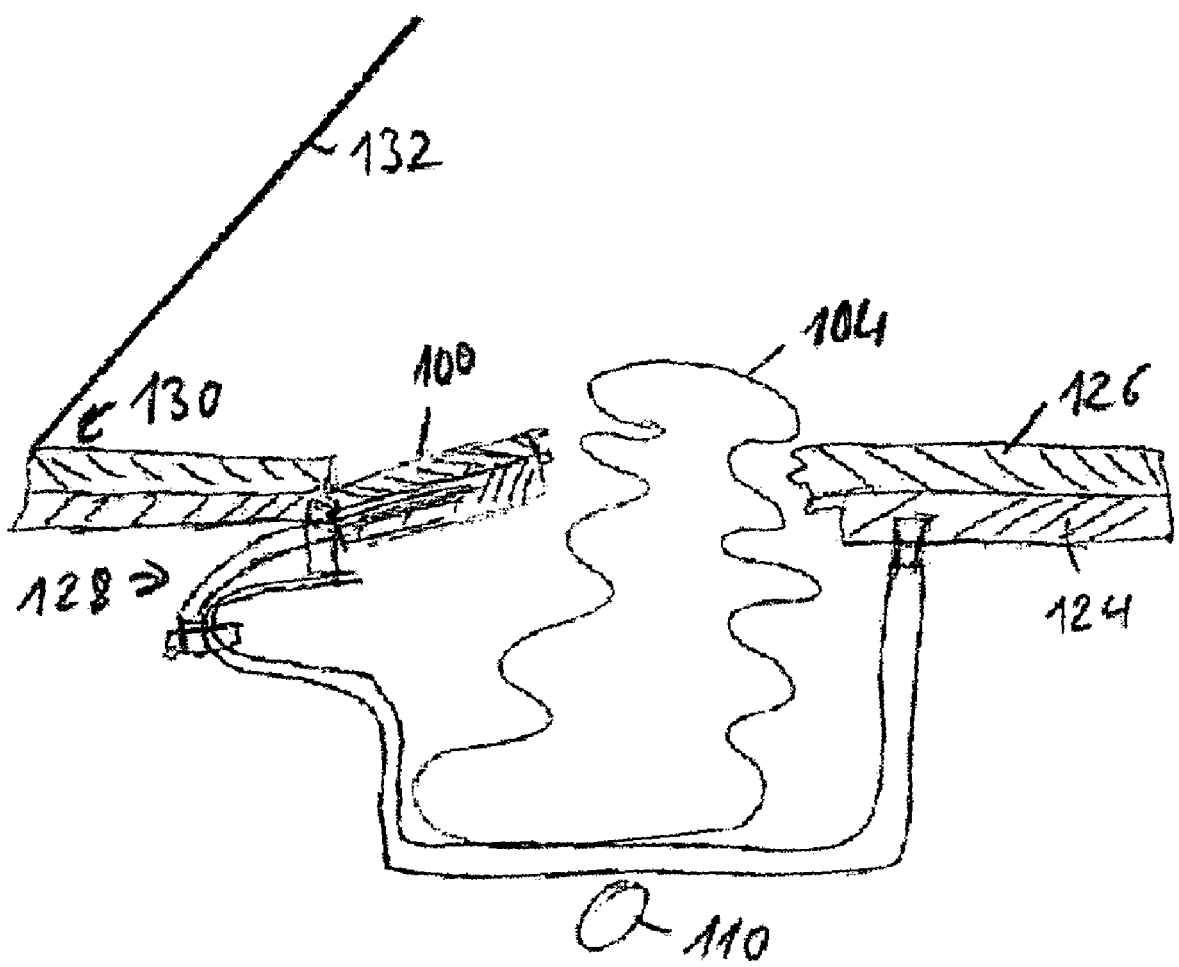
FIG. 4 is the airbag arrangement from FIG. 3 after deployment of the airbag.

FIG. 4 shows the airbag arrangement from FIG. 3 as the deploying airbag 104 exits the outlet opening. As illustrated in FIG. 4, the weaker area 128 was deformed in the direction of the windshield base 130, which caused the weakening grooves 106 to tear open and the airbag cover 100 to be pulled partially beneath the carrier 124. Therefore, the deploying airbag can exit through the outlet opening with relatively low mechanical resistance in order to deploy into the passenger compartment.

During further deployment of the airbag 104 for example, the part of the airbag cover 100 that was not pulled beneath the carrier 124 is being deformed or folded by the deploying airbag 104 in the direction of the windshield 132 or the windshield base 130. Due to this deformation of the airbag cover 100, the outlet opening for the airbag 104 is fully exposed.

Figure 5:
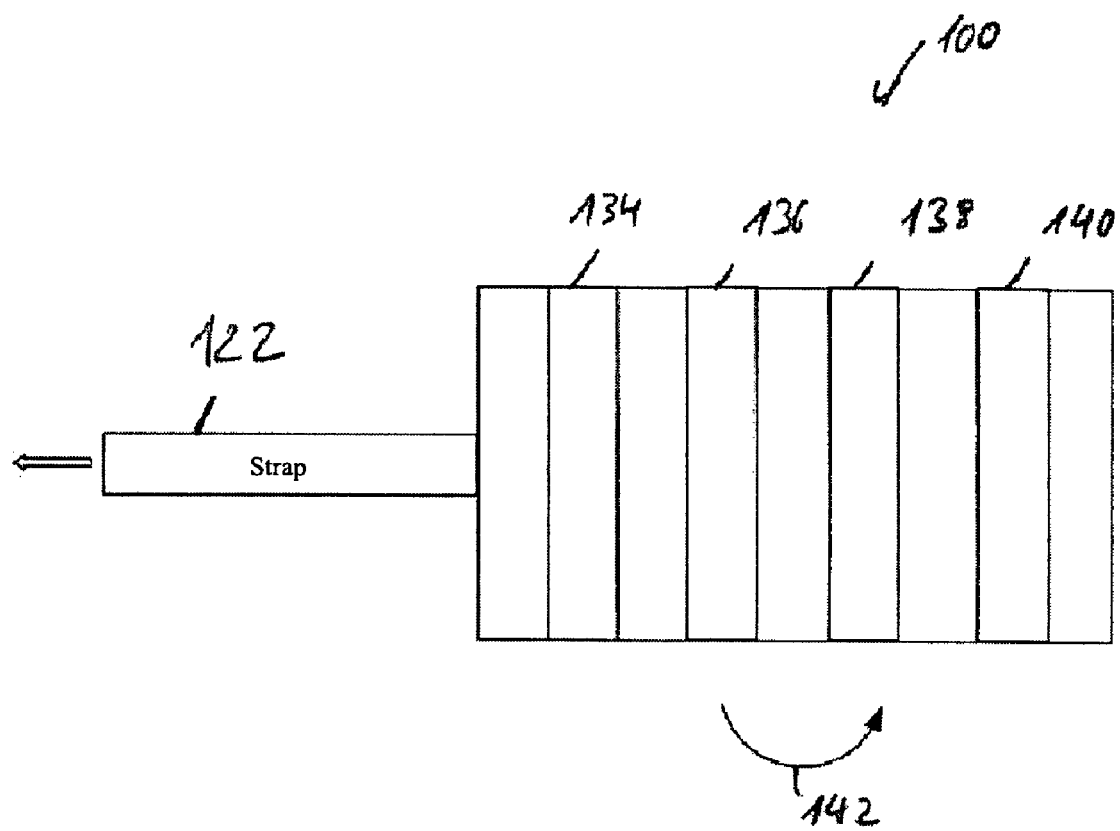
FIG. 5 is a top view on an airbag cover having a segment or grid structure.
Figure 6:
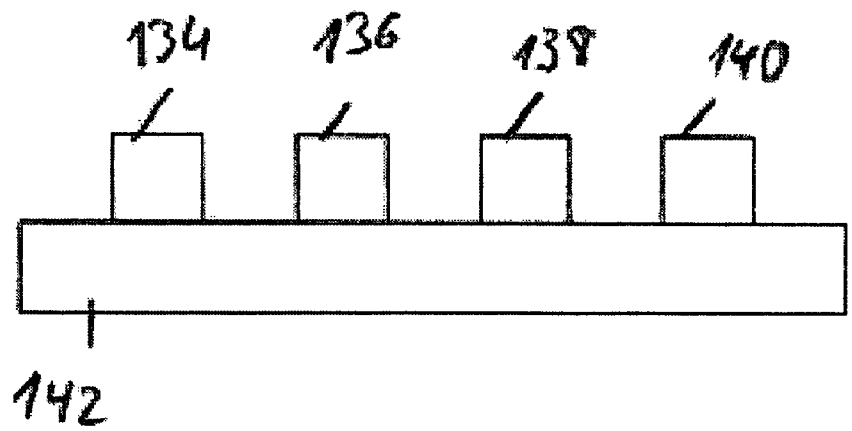
FIG. 6 is a side view of the airbag cover from FIG. 5.

FIG. 5 shows a top view on an embodiment of the airbag cover 100, which is designed in segments. In the embodiment observed here, the airbag cover 100 comprises segments 134, 136, 138, 140, etc. The individual segments are separated from each other by impressions in the airbag cover, as shown in FIG. 6, which illustrates a cross-sectional view of the airbag cover 100. When the airbag is activated, the airbag cover 100 is pulled partially beneath the carrier 124 by the strap 122, as shown in FIG. 4.

For example, the segments 134 and 136 are pulled beneath the carrier 124, while the segments 138, 140, etc. protrude into the outlet opening of the airbag, as shown in FIG. 4. As soon as the deploying airbag 104 impinges upon the segments 138 and 140 of the airbag cover 100 protruding in the outlet opening, these are swiveled in the direction of the arrow 142 towards the windshield 132, such that the outlet opening is fully exposed.

Instead of a segment structure, the airbag cover 100 may also have a suitable grid structure.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

REFERENCE NUMERAL LIST

100 Airbag cover
102 Interior paneling
104 Airbag
106 Predetermined breaking point, weakening groove
108 Airbag module
110 Gas generator
112 Gas pipe
114 Gas pipe
116 Control device
118 Sensor
120 Drive element
122 Strap
124 Carrier
126 Film
128 Weaker area
130 Windshield base
132 Windshield
134 Segment
136 Segment
138 Segment
140 Segment
142 Direction of arrow

The invention claimed is:

1. An airbag arrangement, comprising:
    means for inflating an airbag;
    an airbag cover, which covers a firing channel and is connected to interior paneling;
    means for pressurizing the firing channel with gas pressure; and
    a drive element disposed in or on the firing channel, and mechanically coupled to the airbag cover, wherein the drive element has a temperature-induced deformation effect.

2. The airbag arrangement according to claim 1, wherein the gas pressure is sufficient for the at least partial detachment of the airbag cover from the interior paneling.

3. The airbag arrangement according to claim 1, wherein the gas pressure is sufficient for at least partially opening the airbag cover.

4. The airbag arrangement according to claim 1, further comprising one or more control devices for the inflating means and the pressurizing means, wherein the one or more control devices are designed such that the firing channel is pressurized with the gas pressure before the airbag deploys and impinges upon a rear of the airbag cover.

5. The airbag arrangement according to claim 4, wherein a time interval between activation of the pressurizing means and activation of the inflating means is no more than about 20 ms.

6. The airbag arrangement according to claim 1, further comprising one or more control devices for the inflating means and the pressurizing means, wherein the one or more control devices are designed such that initially the inflating means are activated before the pressurizing means.

7. The airbag arrangement according to claim 6, wherein a time interval between activation of the pressurizing means and activation of the inflating means is no more than about 20 ms.

8. The airbag arrangement according to claim 1, wherein the inflating means and the pressurizing means include a gas generator, and the gas generator is coupled to the firing channel and the airbag.

9. The airbag arrangement according to claim 8, further comprising a valve device disposed between one of: between the gas generator and the firing channel, and between the gas generator and the airbag.

10. The airbag arrangement according to claim 1, wherein the airbag cover has a grid structure or a segment structure.

11. The airbag arrangement according to claim 1, wherein:
    the firing channel is weaker in at least one area, which permits the firing channel to deform in the at least one area during the pressurization with the gas pressure, and
    the at least one area is mechanically coupled to the airbag cover.

12. The airbag arrangement according to claim 11, wherein:
    the interior paneling is a dashboard, and
    the at least one weaker area is arranged on a side of the firing channel that faces a base of a windshield.

13. The airbag arrangement according to claim 11, wherein the at least one weaker area is coupled to the airbag cover by means of a tension element.

14. The airbag arrangement according to claim 1, wherein the drive element is a bimetallic element.

15. The airbag arrangement according to claim 1, wherein the drive element is a shape memory element.

16. The airbag arrangement according to claim 1, wherein the airbag cover is coupled to the interior paneling by means of at least one predetermined breaking point and the at least one predetermined breaking point is broken up by pressurizing the firing channel with the gas pressure.

17. The airbag arrangement according to claim 1, wherein the airbag cover is designed such that it is pulled or swiveled at least partially beneath the interior paneling upon activation of the airbag.

18. An airbag arrangement, comprising:
    means for inflating an airbag;
    an airbag cover, which covers a firing channel and is connected to interior paneling;
    means for pressurizing the firing channel with gas pressure;
    a strap coupled to the airbag cover and airbag; and
    deflection means including a temperature induced deformation effect, across which the strap is guided such that an opening movement of the airbag cover so as to expose an outlet opening of the firing channel is triggered during the inflation of the airbag.

19. An apparatus, comprising:
    a control device for an airbag arrangement, comprising:
        means for recognizing when an activation condition has been met;
        means for controlling one or more gas generator devices for pressurizing a firing channel with gas pressure; and
        means for controlling the one or more gas generator devices for inflating an airbag; and the airbag arrangement, comprising:
            a drive element disposed in or on the firing channel, wherein the drive element is mechanically coupled to an airbag cover and has a temperature-induced deformation effect; and/or
            a strap coupled to the airbag cover and airbag; and deflection means, across which the strap is guided such that an opening movement of the airbag cover so as to expose an outlet opening of the firing channel is triggered during the inflation of the airbag.

20. The control device according to claim 19, wherein emission of a first control signal for pressurizing the firing channel with the gas pressure and emission of a second control signal for inflating the airbag occur in a time-staggered manner.

21. A method for deploying an airbag, comprising:
- controlling one or more gas generator devices to pressurize a firing channel of an airbag chute with gas pressure;
- controlling the one or more gas generator devices to inflate the airbag,
- wherein at least initiation of pressurizing the firing channel with gas pressure occurs before inflation of the airbag, and further comprising at least one of:
- at least partially separating an airbag flap from an interior paneling with a drive element and/or at least partially opening an airbag cover with the drive element, wherein the drive element is disposed in or on the firing channel, is mechanically coupled to an airbag cover, and has a temperature-induced deformation effect; and
- at least partially opening an airbag cover and/or at least partially exposing an outlet opening of the firing channel during inflation of the airbag with a strap and a deflection means, wherein the strap is guided across the deflection means and is coupled to the airbag cover and airbag.

* * * * *